US006368715B1

(12) United States Patent
Willems et al.

(10) Patent No.: US 6,368,715 B1
(45) Date of Patent: Apr. 9, 2002

(54) LIGHT-TRANSMISSIVE SUBSTRATE HAVING A LIGHT-TRANSMISSIVE, LOW-OHMIC COATING

(75) Inventors: Henricus X. Willems; Bauke H. Zwerver; Gerardus V. A. Aben; Johannes M. A. A. Compen, all of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/474,297

(22) Filed: Dec. 29, 1999

(30) Foreign Application Priority Data

Dec. 29, 1998 (EP) ........................................... 98204460

(51) Int. Cl.$^{7}$ ............................................... B32B 17/06
(52) U.S. Cl. ........................ 428/428; 428/426; 428/432
(58) Field of Search ................................ 428/428, 426, 428/432

(56) References Cited

U.S. PATENT DOCUMENTS 5,989,717 A * 11/1999 Allemand et al. .......... 428/426
6,197,418 B1 * 3/2001 Cloots et al. ............... 428/332

FOREIGN PATENT DOCUMENTS

EP 1013413 A1 * 6/2000 ........... B32B/17/10

* cited by examiner

*Primary Examiner*—Margaret G. Moore
*Assistant Examiner*—Michael J. Feely

(57) ABSTRACT

A substrate carrying a mixed organic conductive polymer coating, has a high index of refraction.

On a substrate having $SiO_2$ as a major component, the coating comprises two layers each having $SiO_2$ as a major component. One of the layers comprises a conducting polymer, the other a material having a high index of refraction.

5 Claims, 2 Drawing Sheets

LIGHT-TRANSMISSIVE SUBSTRATE HAVING A LIGHT-TRANSMISSIVE, LOW-OHMIC COATING

BACKGROUND OF THE INVENTION

The invention relates to a light-transmissive substrate having a light-transmissive, low-ohmic coating and in particular to a cathode ray tube comprising a display screen having an electroconductive coating.

The invention also relates to a method of manufacturing an electroconductive coating on a substrate.

Electroconductive coatings are used inter alia, as anti-static layers on display screens of display devices, in particular cathode ray tubes (CRTs). Said layers have a sheet resistance of, for example, $10^6$ to $10^{10}$ Ω/□ and are thus sufficiently electroconductive to ensure that a high electrostatic voltage present on the outside surface of the display screen is removed within a few seconds. Thus, the user does not experience an unpleasant shock if he touches the screen. Besides, the attraction of atmospheric dust is reduced.

Since it may be hazardous to health, shielding from electromagnetic radiation is becoming ever more important. Devices provided with cathode ray tubes, such as display tubes for TVs and monitor tubes, comprise a number of radiation sources which may be hazardous to the user's health if he is exposed to said sources for a long period of time. A substantial part of the electromagnetic radiation generated can be screened off with metal in a simple manner via the housing of the cathode ray tube. However, radiation emitted via the display screen may substantially add to the amount of radiation to which the user is exposed.

This problem is solved by applying a well-conducting coating on the surface of the display screen. Said coating must also be sufficiently transparent in the wavelength range from 400 to 700 nm, i.e. the transmission should be at least 60%. A well-known material which can be used for a transparent and well-conducting coating which meets said requirements is indium-doped tin oxide (ITO). Such a layer can be provided by means of vacuum evaporation or sputtering. Said method requires, however, expensive vacuum equipment. ITO layers can also be manufactured by firing spin-coated or sprayed layers of solutions of indium-tin salts. Said firing operation should be carried out at a temperature of at least 300° C. This temperature is much too high to be used with a complete display tube which, in order to preclude damage to parts of the display tube, can withstand temperatures of typically 160° C.

In German Patent Application DE-A-4229192, a description is given of the manufacture of an anti-static coating for, inter alia, a display screen, said coating being made from poly-3,4-ethylene dioxythiophene and a trialkoxysilane to improve the adhesion. By way of example, a coating is manufactured by providing a desalinated aqueous solution of poly-3,4-ethylene dioxythiophene, polystyrene sulphonic acid and 3-glycidoxypropyl trimethoxysilane on a glass plate, whereafter said glass plate is dried. Said poly-3,4-ethylene dioxythiophene is previously prepared by oxidatively polymerizing the monomer 3,4-ethylene dioxythiophene by means of an Fe(III) salt in water in the presence of polystyrene sulphonic acid to preclude precipitation. The anti-static layer thus obtained has a thickness of 0.6 $\mu$m (600 nm) and a sheet resistance of 50 kΩ/□. This sheet resistance is sufficient to bring about an antistatic effect.

A disadvantage of said known layer is that such layers have relatively poor mechanical properties, especially a low scratch resistance, and they are not well suited to be used in anti-reflection coatings because of the relatively low index of refraction of said layer.

OBJECTS AND SUMMARY OF THE INVENTION

It is an object of the invention to provide, inter alia, a substrate, like a display screen of a cathode ray tube, having a coating, said coating providing an effective shield against electromagnetic radiation and exhibiting good optical and mechanical properties. A further object of the invention is to provide a simple method of manufacturing such light-transmissive well-conducting optical coatings, while it is preferably possible, in particular, to carry out said method at relatively low temperatures (typically up to 170° C.) at which no damage is caused to parts of a cathode ray tube.

A coated substrate as described in the opening paragraph is characterized in that the coating is provided on a substrate containing $SiO_2$, as a major component the coating comprising a first layer and a second layer adjacent to each other, each of the first and second layers comprising $SiO_2$ as a major component, wherein the first layer comprises a high index material having an intrinsic index of refraction which is higher than the index of refraction of the substrate, and the second layer has an index of refraction which is lower than the index of refraction of the substrate and comprises a conductive polymer, the coating having a sheet resistance below 10 kΩ/□.

In accordance with the above-mentioned requirements, such a layer provides an excellent shield against electromagnetic fields. The conductivity of the coating is primarily due to the conductive polymer. A major component of the substrate, the first and second layer is $SiO_2$ (in this respect it is remarked that, within the framework of the invention $SiO_2$ is to be broadly interpreted and includes glasses comprising $SiO_2$ in whatever form, such as float glass and screen glass used for and in cathode ray tubes). This allows a good adhesion of the layers to each other and to the substrate. The thermal coefficients of expansion of the layers and the substrate are comparable because a major component is the same. As regards layers of pure ITO deposited on glass, this increases the adhersion between the glass and the layer and reduces the occurrence of thermal tensions during or after manufacturing. Coatings of pure conductive polymer lack sufficient scratch resistance. However, the conductive coating in accordance with the invention, comprises a layer of mainly $SiO_2$ and is much more scratch-resistant. In the coating in accordance with the invention, the first layer has an index of refraction which is higher than the index of refraction of the substrate, due to the material having an intrinsic (i.e. as a bulk material) index of refraction which is higher than the index of refraction of the substrate, whereas, due to the conductive polymer, the index of refraction of the second layer is lower than that of the substrate. The combination of a first layer having an index of refraction which is higher than the substrate, and a second layer having an index of refraction which is lower than the substrate allows good anti-reflective properties to be attained. Preferably one of the layers comprises a light-absorbing material. In this manner, it is possible to control the light absorbing properties of the coating. Preferably both the first and the second layer comprise an alkoxy compound. The alkoxy-compound provides a strong mechanical coupling between the coating and the substrate and between the layers. Coatings according to the invention can be applied by means of a wet-coating method, not requiring high temperatures. Metal oxide particles, and in particular ATO, ITO and $TiO_2$ particles are suited for use in the first layer. Particularly useful are particles with a very high index of refraction, i.e. higher than 2.0. The index of refraction of the first layer is thereby substantially increased, which increases the possible use of such layers in anti-reflection coatings. Preferably, each layer is a ¼λ layer, i.e. for each layer the product of the index of refraction of the layer and the thickness of the layer is ¼λ (plus or minus 25%) of the wavelength of visible light (380–780 nm). A suitable thickness range for each of the first and second layers between 50 nm and 150 nm.

ITO and ATO are preferred in those circumstances where a charge build-up of the outer layer of the coating is to be prevented. The at least partly conductive nature of ITO and ATO particles prevents electrical charge from accumulating.

An electroconductive coating in accordance with the invention, optionally with one or more additional layers can also be suitably used as a touch screen coating on a CRT or LCD display screen. By touching a certain part of the touch screen coating on the display screen, a local change in resistance is induced which is translated, via electronic controls, into a localization and a subsequent action, such as opening a menu, turning pages, etc. It is alternatively possible to write on the display screen with a pen, whereafter the writing is identified and processed.

For the additional layer, use may be made of a silicon dioxide layer having a thickness of 50 nm to 250 nm. Using a tetra alkoxysilane, such as TEOS, as the precursor, such a layer can be provided in a simple manner by means of a sol-gel process, followed by curing at a relatively low temperature (about 160° C.).

The object of providing a simple method of manufacturing a transmissive electroconductive coating on a substrate (like a display screen of a cathode ray tube) is achieved in an embodiment in that the coating is manufactured by providing the substrate with a porous layer comprising high index material (such as ITO or ATO) having an index of refraction which is higher than the substrate subsequently applying a coating solution of a monomer of which the polymer is conductive and an Fe(III) salt on the substrate, whereafter a treatment at an increased temperature is carried out, thereby forming a layer comprising a conductive polymer, (such as poly-3,4-ethylene dioxythiophene) and an Fe(II) salt, after which the double layer is rinsed with an ethanolic solution (e.g. an ethanolic $SiO_2$ precursor, such as e.g. a tetra alkoxysilane like TEOS) which is capable of extracting Fe salts, thereby forming the electroconductive coating. Optionally an organic base can be added to stabilize the system.

The ethanolic solution penetrates the porous layer forming a first layer comprising mainly $SiO_2$, and at the same time extracts the Fe salts from the layer comprising the conductive polymer forming the second layer. This ensures a good adhesion between the first and the second layer and a good adhesion between the first layer and the substrate.

In general, polymers are slightly soluble. In order to obtain a processable polymeric solution, the polymerization reaction is often carried out in the presence of a large quantity of a stabilizing polymer, such as polystyrene sulphonic acid. Said polymer, however, leads to an increase of the sheet resistance. In a preferred embodiment of the method in accordance with the invention, a solution of the monomer instead of a solution of the polymer, is provided on the surface of the display screen. The monomer is subsequently converted to the polymer. The monomer 3,4-ethylene dioxythiophene is converted to the corresponding polymer by means of oxidation with an Fe(III) salt. Fe(III) salts are very suitable because of the redox potential ($E_{red}$=0.77 V at room temperature) which is very favorable for this reaction. Fe(III) salts of organic sulphonates are very suitable because of their high solubility in alcohols and low crystallization rate in the liquid layer to be provided. Examples of said salts are Fe(III)-p-toluene sulphonate and Fe(III)-ethylbenzene sulphonate.

Solutions of 3,4-ethylene dioxythiophene monomers and Fe(III) salt, which is necessary for the polymerization reaction, are unstable. When said components are mixed, a polymer soon forms in the solution, as a result of which the pot-life of the coating solution becomes impractically short. Surprisingly, it has been found that the reaction rate of the polymerization reaction is decreased by adding small quantities of a soluble organic base to the coating solution. Dependent on the concentration of the base, the reaction at room temperature can be suppressed completely. In the case of an efficacious base concentration, solutions comprising monomers and the Fe(III) salt can remain stable at room temperature for at least 24 hours: polymerization does not take place. These stable solutions can be used to apply thin layers to the display screen by, for example, spin coating. After heating of the layer, electroconductive poly-3,4-ethylene dioxythiophene is formed. Besides, it has been found that the addition of the organic base has a favorable effect on the conductivity of the polymer and hence on the sheet resistance of the conductive coating. Presumably, the organic base forms a complex with the Fe(III) salt, which results in a reduction of the redox potential at room temperature. This leads to a reduction of the reaction rate, so that a more controlled polymerization at an increased temperature takes place and the specific conductivity increases by approximately a factor of two.

Suitable soluble bases for this method include, for example, imidazole, dicyclohexylamine and 1,8-diazabicyclo[5.4.0]undec-7-ene (DBU).

Said compounds can readily be dissolved in various alcohols, such as isopropanol and 1-butanol. A solution of said compounds, for example, in 1-butanol is used as the coating solution and has a pot-life of approximately 12 hours. Before the coating solution is used, it is preferably filtered over an 0.5 μm filter.

The coating solution can be provided on the substrate, like a CRT or LCD display screen, by means of customary methods, such as spraying or atomizing. The solution is preferably spin-coated onto the display screen. This results in a smooth, homogeneous and thin layer. During spin coating, the layer provided is dried and subsequently heated to a temperature of typically up to 170° C. by means of a furnace, a jet of hot air or an infrared lamp. At a temperature between 100° C. and 150° C., the polymerization reaction is completed within 2 minutes. The increased temperature initiates the polymerization reaction in which the Fe(III) salt is converted to the corresponding Fe(II) salt. The color of the coating changes from yellow to bluish green. The eventual thickness of the coating depends on the number of revolutions during spin-coating and on the concentration of the dissolved compounds.

The Fe(III) and Fe(II) salts must be removed from the polymerized coating to prevent a dull layer as a result of crystallization. In addition, the Fe(II) salt leads to an increase of the sheet resistance of the coating by a factor of ten. The Fe salts are removed by rinsing the coating with a suitable solvent. In this process, the Fe salts are extracted from the coating. This leads to a strong reduction of the thickness of the coating, increasing the density of the conducting polymer and substantially increasing the conductance of the coating. Surprisingly, rinsing with an ethanolic $SiO_2$ precursor like TEOS results in a mixed Polymer/$SiO_2$ layer having attractive optical (anti-reflective) mechanical (scratch resistance) and electrical (conductance) properties.

DETAILED DESCRIPTION OF THE INVENTION

These and other aspects of the invention are apparent from and will be elucidated, by way of non-limitative example, with reference to the embodiments described hereinafter.

An object of the invention is the use of an organic conductive polymer in a CRT having a panel substrate with a light-transmissive low-ohmic coating. The coating according to the invention combines a low surface resistance with good mechanical and optical characteristics.

Figure 1:
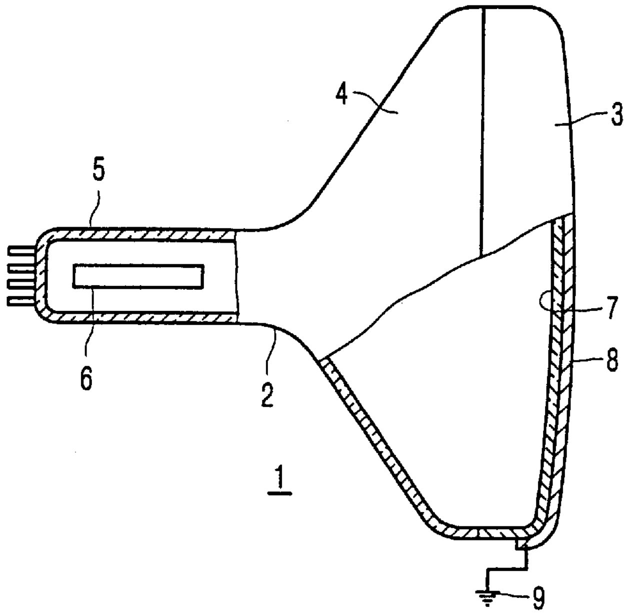
FIG. 1 is a diagrammatic view, partly cut away, of an embodiment of a CRT having a panel substrate with a light-transmissive low-ohmic coating according to the invention.

FIG. 1 is a diagrammatic view shows, partly cut-away, of an embodiment of a CRT (1) having a panel substrate (3) a light-transmissive low-ohmic coating (8) according to the invention on a faceplate (7). The CRT has an evacuated envelope (2) which, apart from the substrate (3), comprises a funnel-shaped part (4) and a neck (5), in which neck an electron gun (6) is provided. The light-transmissive coating is electrically connected to earth (or to a fixed voltage) (9). The light-transmissive coating should have good mechanical properties, more in particular with respect to adhersion to the faceplate (7) in operation as well as during manufacture of the CRT. Furthermore, the light-transmissive coating should preferably also reduce the reflection on the faceplate.

Figure 2:
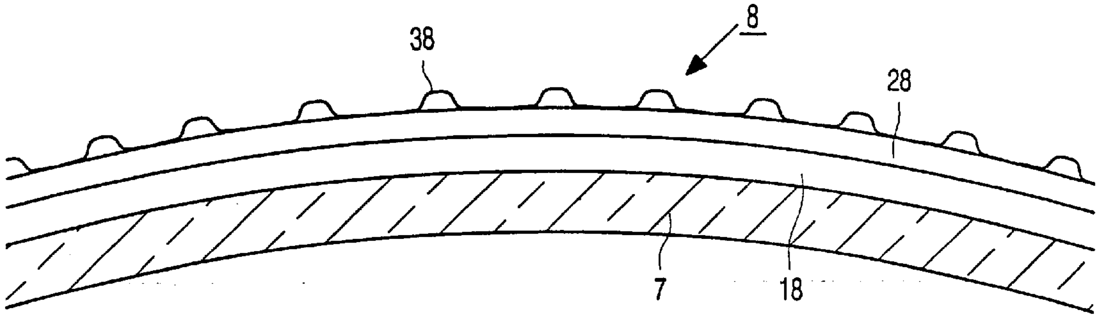
FIG. 2 shows schematically a light-transmissive coating in accordance with the invention.
Figure 4:
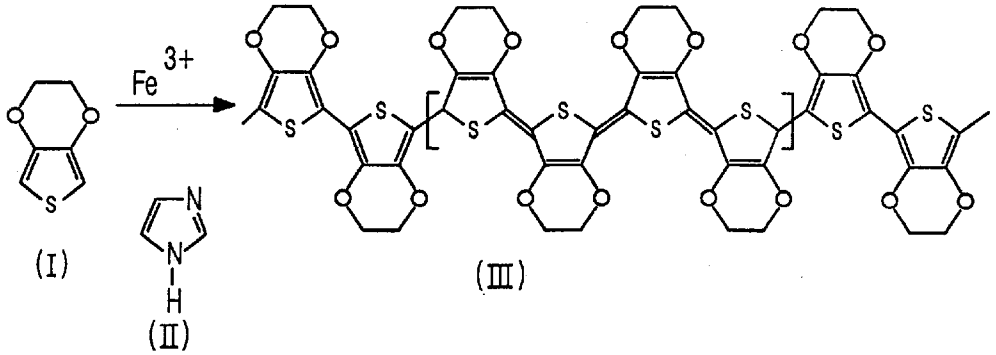
FIG. 4 shows the reaction scheme of the preparation of electroconductive poly-3,4-ethylene dioxythiophene (formula III) using 3,4-ethylene dioxythiophene (formula I) as the starting material.

FIG. 2 shows schematically a light-transmissive low-ohmic coating (8) on a faceplate (7).

Faceplate 7 is provided with light-transmissive low-ohmic coating 8. The faceplate mainly comprises of $SiO_2$. Faceplate glass is mostly $SiO_2$. The glass may comprise other substances such as other oxides. The coating 8 comprises a first layer 18, which mainly comprises $SiO_2$ and further comprises materials having an index of refraction which is intrinsically (i.e. when in the bulk form) higher than the index of refraction of the substrate. In this respect, it is remarked that the index of refraction of CRT glasses is typically approximately 1.54. The first layer has $SiO_2$ as a major component. 'As a major component' means that the matrix of the layer is formed by $SiO_2$. At least 35%, but usually and preferably 50% (in volume percentage) or more of the layer is formed by $SiO_2$. As stated before, $SiO_2$ includes any kind of silicon dioxide. The second layer (28) comprises $SiO_2$ and a conductive polymer. A third anti-glare layer (38) may be provided.

Figure 3A:
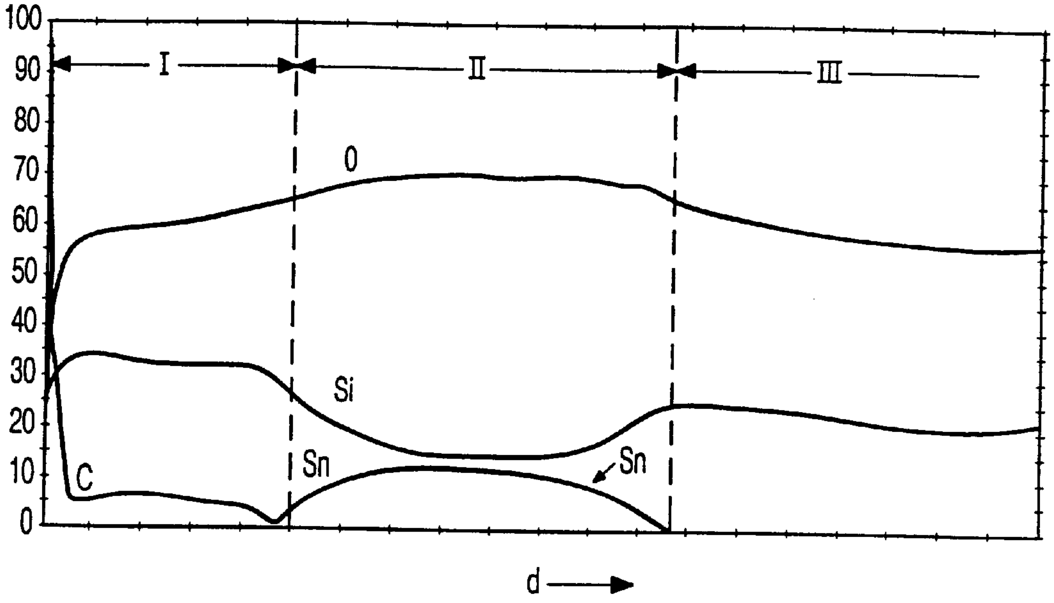
FIGS. 3A and 3B illustrate, in the form of graphs, the composition of the coating and substrate in two embodiments of the invention.
Figure 3B:
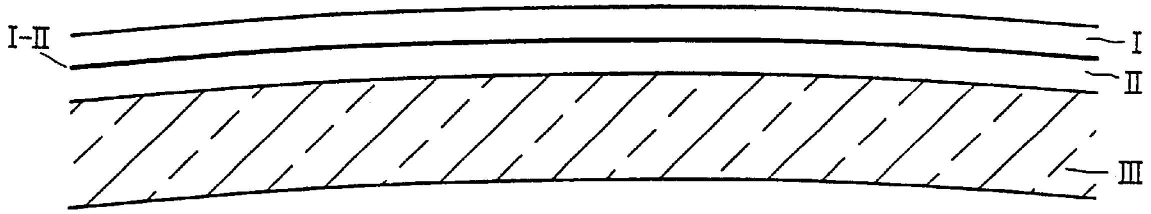

FIGS. 3A and 3B illustrate, in a graphical form, the composition of an embodiment of the invention which has been made according to the method described hereinbelow.

The vertical axis in the Figures denotes the atomic percentage (A.C.) of the different atomic components. Region I is formed by the second conducting layer (28), region II by the first (high refractive index) layer (18) and region III by the substrate (8). The compositions are measured by means of sputtering the coated substrate and measuring the composition of the sputtered material. The horizontal axis stands for the thickness d of the layers. FIG. 3A gives the percentages of O (oxygen), Si (silicon), C (Carbon) and Sn (Tin) on a course scale (tens of percentage). Thus, all layers have $SiO_2$ as a major component. In region I, C is prominently present, approximately 8%. In region II large quantities of Sn, approximately 12 atomic percent are present (due to the presence of ITO or ATO particles). Note that it can be seen in the Figures that the composition of layer I near the outer surface of this layer differs strongly from its overall composition. This is due to contamination of the surface of layer I, especially with all kinds of carbon-hydrogen compounds. This is not an uncommon feature. In fact, sputtering is often used to clean surfaces. Region III corresponds to the substrate (8). The percentage of Sn in region II (the first layer) is indicative of the presence of ATO (Antimony-doped, Indium-Tinoxide). ATO has an index of refraction which is considerably higher than that of $SiO_2$. The index of refraction of the first layer is approximately 1.65, i.e. substantially higher than 1.54. The resistance of the coating is 3° kΩ/□, which is good. The index of refraction of the second layer (region I) is lowered by the presence of C.

A method in accordance with the invention will now be described.

Several methods are known to obtain to a low-ohmic coating. It has been shown that a conductive ITO (indium tin oxide) layer of 100Ω can be deposited on glass substrates by spray pyrolysis. The substrate is heated to a temperature up to 500° C. Instead of spray pyrolysis, spinning techniques may be used. A curing step of 400° C.–500° C. is necessary to form the $Sn{:}In_2O_3$ lattice. Coated tubes, can be annealed only by means of rapid thermal annealing techniques like laser curing.

This invention deals with a different approach, i.e. the use of conductive polymers and the use of a common major component for all layers and the substrate. Among the conductive polymers, polythiophenes have attracted growing interest. Polythiophene and its derivatives are the first class of polymers which are chemicals and are electrochemically stable in air and moisture. They are also transparent so that they can be used as optical coatings. The common major component is $SiO_2$.

The starting materials are EDOT (ethylenedioxythiophene) and iron(III)-toluene sulphonate ($Fe(TOS)_3$). In the present application, chemical polymerization takes place on the surface of the CRT or other transmissive substrate. This invention describes the processing of a high index layer with an $SiO_2$/PEDOT+$SiO_2$ double layer having electric shielding and anti-reflective properties.

Processing

In a first method step, a porous layer of a material having a high index of refraction is provided on a substrate. This may be formed by a dispersion of ATO or ITO or $TiO_2$ particles (average diameter in the order of 10 nm) in water/ethanol which is applied to the substrate by means of spin coating. This forms the precursor for the first layer. Thereafter, a coating solution of a monomer of a conductive polymer (such as 3,4-ethylene dioxythiophene) and an Fe(III) salt is applied on the porous layer, whereafter a treatment at an increased temperature is carried out, thereby forming a layer comprising a conductive polymer, (such as poly-3,4-ethylene dioxythiophene), and an Fe(II) salt, after which the double layer is rinsed with an ethanolic $SiO_2$ precursor (e.g. a tetra alkoxysilane like TEOS) which is capable of extracting Fe salts, thereby forming a first layer having an index of refraction which is higher than the index of refraction of the substrate and a second layer forming an electroconductive layer having an index of refraction which is lower than the first layer.

As mentioned before, the processing is based on the chemical polymerization of a monomer such as EDOT to a polymer such as PEDOT. $Fe(TOS)_3$ is used as an oxidising agent, butanol is used as a solvent. The EDOT or PEDOT solution is applied by spin-coating. To polymerize EDOT, a heat treatment is necessary. The Fe-salt has to be removed from the coating. Water or ethanol rinsing may be used. A layer thickness difference of a factor of 10 to 20 between the unrinsed and rinsed coating was observed. Obviously, during this step the PEDOT chains are compacting. To process PEDOT to a hybrid polymer/$SiO_2$ system, the invention makes use of this behavior by rinsing materials like TEOS (tetra ethyl orthosilicate) solution.

To initiate the polymerization, the substrate temperature is an important parameter: the higher this temperature, the faster the polymerization starts. Preferably, a temperature of between 30° C. and 50° C. is chosen because higher temperatures may lead to spinning problems. Once the polymerization has started, it accelerates itself.

In a particular process, the conditions are as follows: the surface of the tube is heated by use of IR radiation (400 K) to 35° C.–40° C. The EDOT solution is applied at 200 rpm. After the film has dried, a reaction time of 2 minutes is needed. Subsequently, an ethanolic TEOS solution is applied at 400 rpm. The coating is cured in an oven at 160° C. for 20 minutes.

An embodiment of the method in accordance with the invention is given below by way of example.

Embodiment

A 2% dispersion of ATO particles (average diameter of the order of 10 nm) in water/ethanol was applied to a substrate by means of spin coating. A solution was made by mixing with 10 g ethanol, 45 g butanol, 25 g $Fe(TOS)_3$ and 1 g EDOT. The resulting coating liquid was spin-coated on the substrate over the porous layer at a temperature of 35° C. Polymerization was thereby accomplished. The coating was rinsed with a solution comprising TEOS. When the rinsed coating had dried, a 65 g/l TEOS solution was applied to the coating by spin-coating. Thereafter, the substrate with coating was heated to 160° C. for 30 minutes. The resulting coating had a sheet resistance of 1 kΩ/□, a good scratch resistance and a good adhesion. The reflection was 2.5% in the visible range. After the coating had been dried, it had a layer thickness of several hundred nm. The layer had a high transmission in the blue wavelength range and because slightly absorptive from 500 nm. Between 400 nm and 650 nm, the transmission was at least 80%.

The reflection was good (of the order of 1–3%), and to were the resistance (below 10 kΩ/□) and the scratch resistance and adhesion. The incorporation of transparent particles having a high index of refraction (preferably higher than 1.8), for instance ITO, ATO or $TiO_2$, has the advantage that the index of refraction of the second layer is increased due to the incorporation of particles having the high index of refraction.

The optical properties (n, k) of the coating are thus appropriate to design an anti-reflective coating. The reflection minimum of the coating is approximately 2.5%–1.5%.

The mechanical properties of this layer are good; depending on the TEOS concentration, the pencil hardness may range from H3/H4 to H5/H6 and the abrasion resistance is sufficient.

Curing this layer is possible up to 160° C.–170° C. Higher curing temperatures are not recommended because this results only in a faster degradation and will not improve the mechanical properties significantly.

Conclusion: chemical polymerization of EDOT and Fe(III)toluene sulphonate on the faceplate of a CRT is possible. Rinsing out the Fe-salt with a TEOS solution results in a mixed PEDOT/$SiO_2$ layer with a sheet resistance which is low enough to fulfil the TCO requirements concerning the alternating electric field. In the method according to the invention, this rinsing method is used to produce a coating comprising a first layer in which high index materials, e.g. metal oxides like $TiO_2$ are incorporated, on top of which first layer a second layer incorporating a conductive polymer such as PEDOT is provided.

What is claimed is:

1. A light-transmissive substrate having a light-transmissive, low-ohmic coating, wherein said substrate consists essentially of SiO2, the coating comprising a first layer comprising silicon dioxide as a major component and a material having an intrinsic index of refraction that is higher than the index of refraction of the substrate and a second layer comprising silicon dioxide as a major component and an organic conductive polymer and having an index of refraction that is lower than the index of refraction of the substrate, the coating having a sheet resistance below 10 kΩ/□.

2. A substrate as claimed in claim 1, wherein the index of refraction of the high index material is higher than 2.0.

3. A substrate as claimed in claim 2 wherein the high index material is a member selected from the group consisting of ATO, ITO and TiO2.

4. substrate as claimed in claim 1, wherein the coating, alone or in combination with a transparent further coating, forms an anti reflective filter.

5. A substrate as claimed in claim 1 wherein the organic conductive polymer is a member selected from the group consisting of polythiophene and its derivatives.

* * * * *